May 24, 1966     M. H. LILL     3,252,544
RUNWAY GUARDING APPARATUS
Original Filed Aug. 18, 1961     4 Sheets-Sheet 2

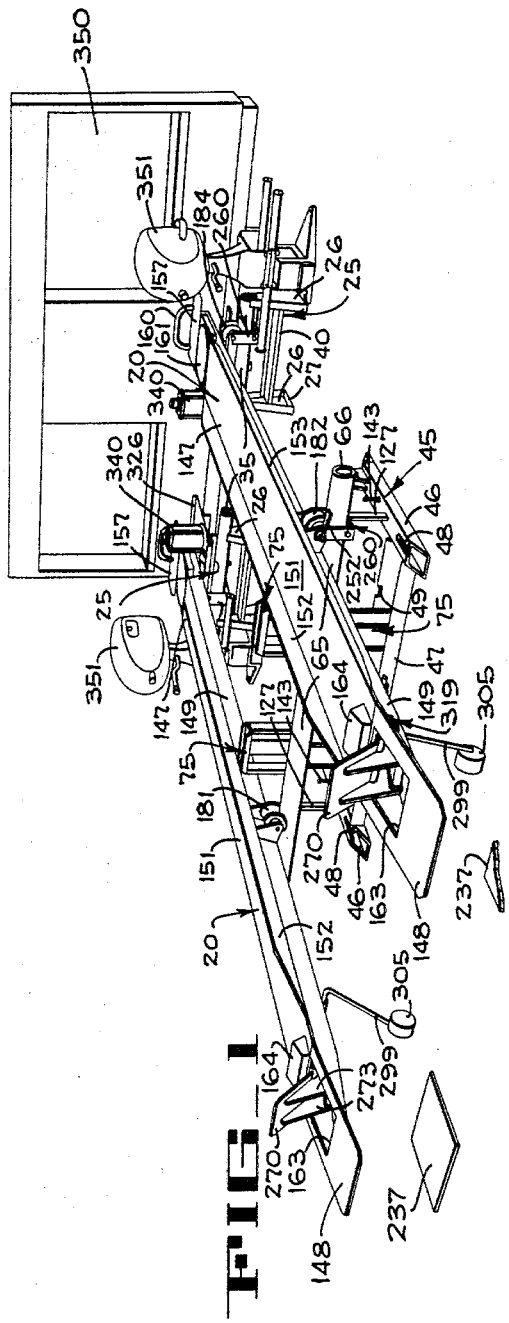

INVENTOR
MELVIN H. LILL
BY Hans G. Hoffmeister
ATTORNEY

May 24, 1966 M. H. LILL 3,252,544
RUNWAY GUARDING APPARATUS
Original Filed Aug. 18, 1961 4 Sheets-Sheet 3
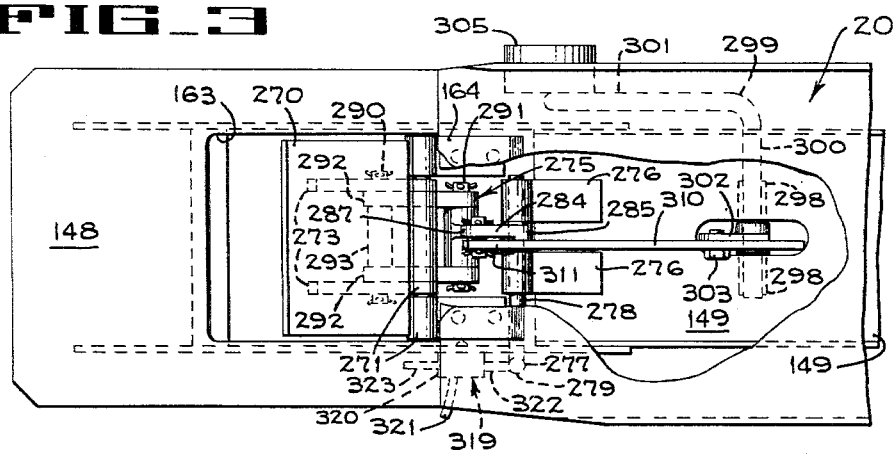
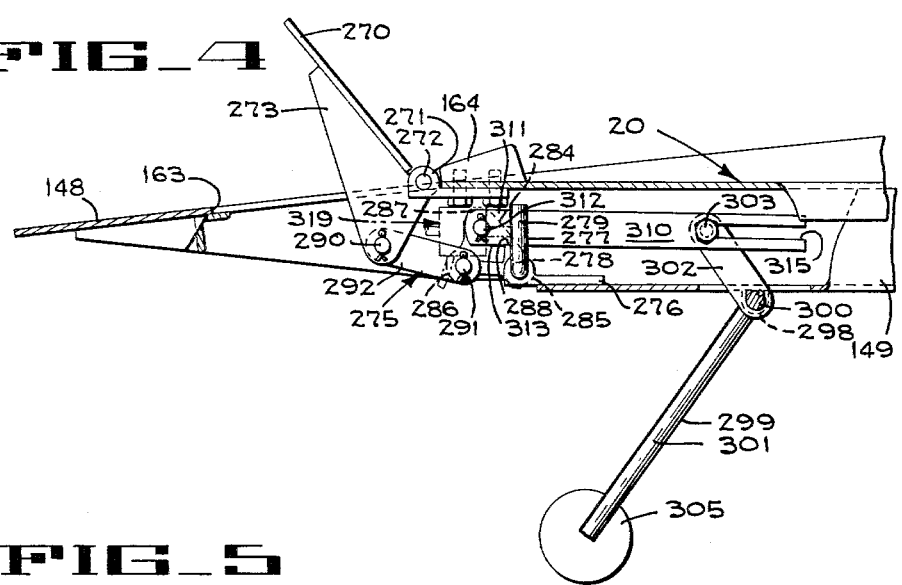
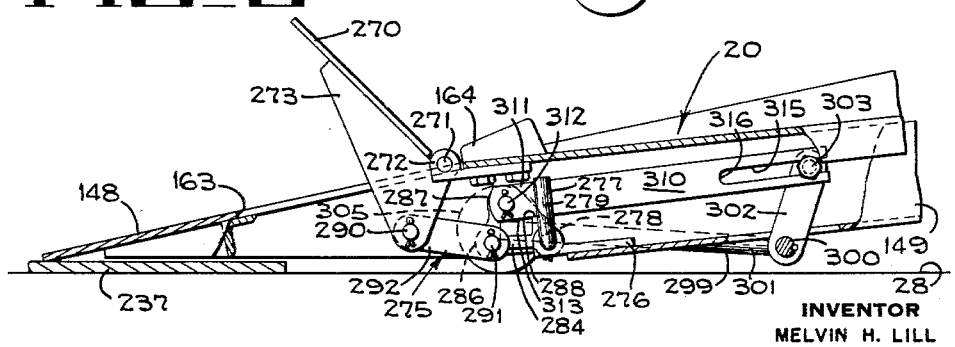
INVENTOR
MELVIN H. LILL
BY Hans G. Hoffmeister
ATTORNEY May 24, 1966 M. H. LILL 3,252,544
RUNWAY GUARDING APPARATUS
Original Filed Aug. 18, 1961 4 Sheets-Sheet 4
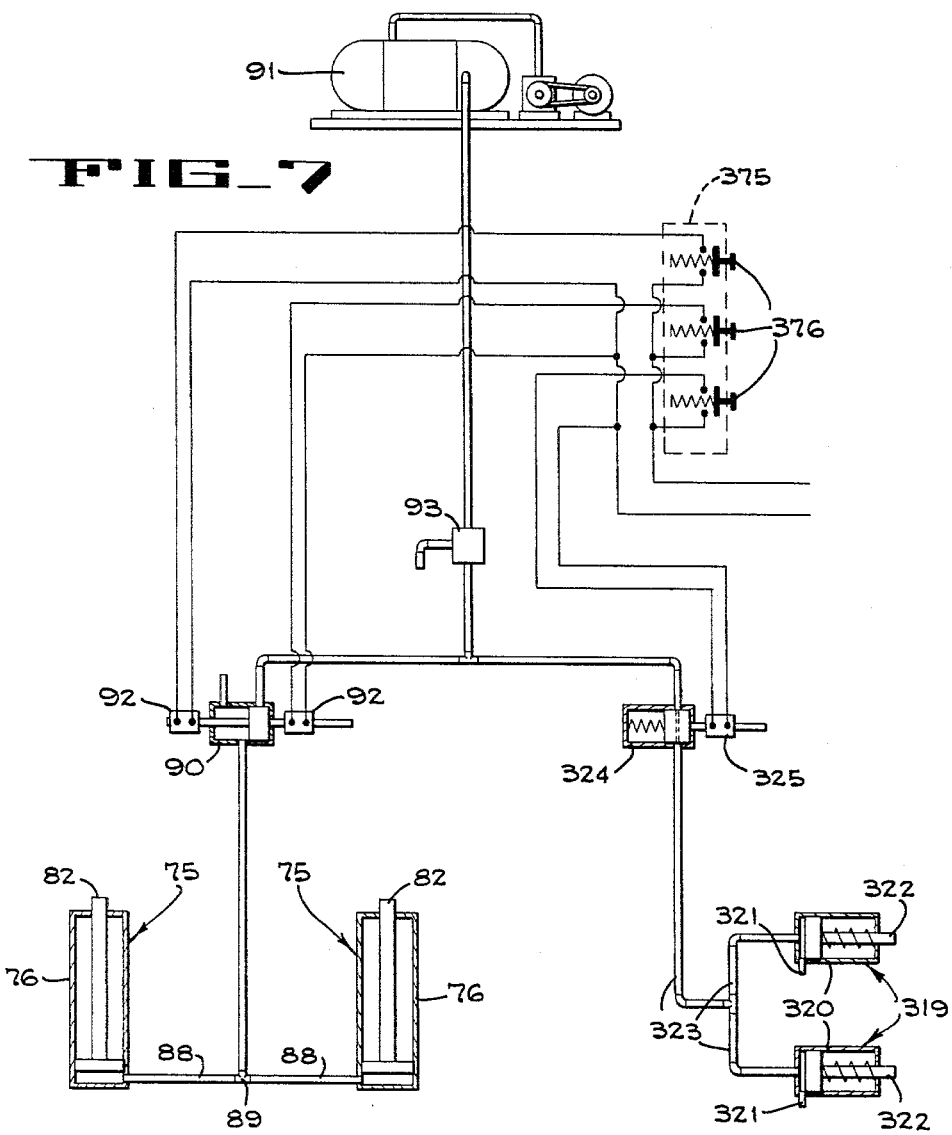
INVENTOR
MELVIN H. LILL
BY *Hans G. Hofmeister*
ATTORNEY United States Patent Office 3,252,544
Patented May 24, 1966

3,252,544
RUNWAY GUARDING APPARATUS
Melvin H. Lill, Lansing, Mich., assignor to FMC Corporation, San Jose, Calif., a corporation of Delaware
Original application Aug. 18, 1961, Ser. No. 132,473, now Patent No. 3,190,395, dated June 22, 1965. Divided and this application June 29, 1964, Ser. No. 378,768
14 Claims. (Cl. 187—8.52)

The present application is a division of my prior copending application entitled, Vehicle Supporting Rack, Serial No. 132,473, filed August 18, 1961, and now Patent No. 3,190,395.

The present invention pertains to a runway guarding apparatus for a vehicle supporting rack and more particularly to an apparatus which automatically moves a runway guard into an up position when the runway is raised but which does not move the guard into a down position in direct response to lowering of the runway whereby the guard remains up until independently lowered.

It is known to support an automobile on a rack in a generally horizontal work position for checking wheel alignment, for lubrication, for inspection and repair, and the like. Conventional racks for this purpose usually include a pair of runways, on which the vehicle is driven, and wheel guards which are movable between a lower position flush with the runways, to permit the vehicle to drive on and off the runways, and a position projecting upward from the runways in order to preclude inadvertent rolling of the vehicle off the runways. Normally, when the rack is not in use, the guards are in their lower positions. If the runways are of the type which are moved between a lower loading and unloading position and an upper work position, mechanism is generally provided for automatically moving the guards into their upper guarding positions in response to movement of the runways into their upper work positions. Conversely, such a mechanism automatically moves the guards from their up to their down positions in response to lowering of the runways.

If the runways are of the type which remain horizontal in both the loading and unloading position and the work position, automatic lowering of the guards upon lowering of the runways is a desirable feature. However, if the rack is of the type that has inclinable runways, that is, mounts the runways for movement between an inclined loading and unloading position and a horizontal work position, then the automatic retraction in direct response to the lowering of the runways into inclined position is an undesirable feature. In fact, it is a hazardous feature and may result in an accident if the runways are lowered, either intentionally or inadvertently, and the supported vehicle is not properly braked or blocked, whereupon the vehicle will roll uncontrollably off the runways.

It is an object of the present invention to provide a runway guarding apparatus for a vehicle supporting rack in which the runway guard is not lowered in response to lowering of the runway.

Another object is to provide a vehicle supporting apparatus in which a runway guard remains locked in guarding position when the runway returns to a lower, vehicle loading or unloading position.

Another object is to provide a runway guarding apparatus which automatically moves a runway guard into an upper guarding position in response to movement of the runway into an upper work position but which does not automatically return the guard to a lower retracted position when the runway returns to its lower position.

Another object is to provide a runway guarding apparatus that can be controlled from a remote position, especially for moving the guard from its guarding position to its retracted position at a selected time subsequent to lowering of the runway.

Another object is to provide a runway guarding apparatus that reduces the hazards associated with operation of a vehicle supporting rack.

Another object is to provide a guard control apparatus which does not interfere with lowering of the runway and which is operable to retract the guard only by manual or mechanical actuation independently of the elevational or other movement, of the runway.

These, together with other objects and advantages, will become apparent upon reference to the following description and accompanying drawings, in which:

FIG. 1 is a perspective of a vehicle supporting rack, as well as associated wheel alignment apparatus, and employing a guarding apparatus which embodies the present invention.

FIG. 2 is a side elevation of the rack in a level work position with a vehicle supported thereon.

FIG. 3 is an enlarged fragmentary plan of a rear portion of one of the runways of the subject rack with a portion of the runway being broken away and with the runway guard being shown in a raised position.

FIG. 4 is a side elevation of the runway and guarding apparatus, as shown in FIG. 3, but with portions broken away and in section.

FIG. 5 is a view similar to FIG. 4 but shows the runway in a lower inclined position and the guard in an up position.

FIG. 6 is a view similar to FIG. 5 but shows the guard in a down position.

FIG. 7 is a schematic of an electro-pneumatic circuit employed with the subject rack.

The vehicle supporting rack of the present invention comprises a pair of elongated runways 20 (FIG. 1) each of which is supported at its forward end on a pedestal 25. Each pedestal provides spaced, upstanding, triangular inner and outer brackets 26, each bracket having bottom edges 27 bolted, or otherwise secured, to a floor 28, and having an upper apex.

Each pedestal 25 also includes a cylindrical front support rail 35 (FIG. 1) connected to the apices 29 of the brackets 26, the two rails 35 being in axial alignment with each other. Each rail has an upper convex surface concentric with its longitudinal axis, an inner end, and an outer end. A tool tray 40 rigidly interconnects the two brackets 26 of each pedestal in downwardly spaced relation to the corresponding support rail 35.

The rearward ends of the runways 20 are supported on a rear transverse base 45 (FIG. 1) that is disposed in rearwardly spaced relation to the pedestals 25. The base provides two spaced, substantially parallel, longitudinal base portions 46 (FIG. 1) interconnected by a transverse base portion 47. Each of the base portions 46 preferably has a box section and has a rear longitudinal slot 48.

Pairs of spaced ears 55 (FIG. 2) are rigidly connected to, and project upwardly from, forward ends of each of the longitudinal base portions 46. Elongated lift arms 56 have front ends 57 individually pivotally connected between the pairs of ears by pins 58, and also have opposite rear ends 59. The lift arms are thus mounted in substantially parallel relation to each other and in transversely spaced relation for elevational pivotal movement about a common axis extended transversely of the rack. The lift arms are pivotal about said axis between upper and lower positions.

A cylindrical rear support rail 65 provides opposite outer end portions 66 rigidly connected to the rear ends 59 of the lift arms 56. The rear rail is thereby positioned in rearwardly spaced, substantially parallel relation to the front support rails 35. A stop block 67 is connected to the underside of each end portion of the rear rail in outwardly spaced relation to the lift arms. The rear support rail 65 also has an upper convex surface concentric to the longitudinal axis of the rail. An elongated tubular lift bar 69, which is substantially parallel to rail 65, rigidly interconnects the lift arms, so that the bar is in forwardly spaced, substantially parallel relation to the rear support rail.

Two rams 75 (FIG. 1) are used to actuate the lift arms, and each ram includes a cylinder 76 having a lower end mounted on the transverse base portion 47. Tubular piston rods 82 are slidably fitted in the bores of the cylinders and provide upper ends 84 connected to inverted, U-shaped yokes 105 disposed over the cylinders 76.

The lift arms 56 are, therefore, adjustable in a vertical direction as a result of upward expansion and downward retraction of the piston rods 82 in their cylinders 76.

An elongated shaft 125 (FIG. 2) extends through the tubular lift bar 69 coaxially therewith and provides opposite ends that are freely rotatably received in the lift arms 56 and project outwardly therefrom. Safety support legs 127 have inner ends rigidly connected to the outer ends of the shaft 125. The two legs 127 are radially extended from the shaft in a common radial plane and are gravitationally swingable relative to the lift arms from a retracted position, extended alongside of the lift arms when the arms are in their lower position, to a runway-supporting position angularly downwardly extended from the lift arms when the lift arms are in their upper position.

An L-shaped latch 135 (FIG. 2) is pivotally connected to one of the lift arms 56 for pivotal movement about an axis parallel to the shaft 125. The latch has a latching arm including a finger adapted to hook over the abutting end of the leg in its retracted position, and a releasing arm perpendicular to the latching arm. The latch is pivotal between a latching position, wherein the finger is disposed in latching engagement with the leg, and an unlatched position wherein the finger is spaced forwardly of the abutting end of the leg and is spring-urged into its latching position. An unlatching stud 143 is rigidly secured to the base portion 46 and projects upwardly therefrom adjacent to the latch and is engageable with the releasing arm when the associated lift arm is lowered. Accordingly, the latch is automatically moved to its unlatching position when the arm 56 moves downwardly toward the base 46.

Each of the runways 20 of the rack has a front mounting end portion 147 (FIGS. 1 and 2) and a rear vertically movable end portion 148. The runways are positioned over the transverse rails 35 and 65 with the front end portions extended over the front rails 35 and with the rear end portions extended over the rear rail 65. The runways are in transversely spaced relation to each other and each runway is located above one of the lift arms 56. Each runway includes a lower, upright channel member 149 extended longitudinally of the runway. An upper wheel plate 151 overlays and is secured to the channel member; the wheel plate provides an upwardly extended inner flange 152 and a downwardly turned outer flange 153. A U-shaped saddle 155 (FIG. 2) is welded to and extends forwardly from the wheel plate 151 and has spaced front and rear flanges extended transversely of the channel member. A step plate 157 is welded to the front flange of the saddle 155 and projects forwardly therefrom and transversely outwardly from the channel member. Each step plate includes a pair of upwardly opening sockets, not shown, into which the legs of a U-shaped wheel stop 160 is releasably fitted. Turntables 161 are received in the saddles and are mounted on the runways for rotation, in any well-known manner to permit pivoting of the wheels during the wheel aligning operation. The wheel plates have rear, substantially rectangular openings 163 (FIG. 1), and an abutment member 164 is secured to each plate forwardly of the opening 163.

A pair of front roller mounting brackets 170 (FIG. 2) of angulated cross-section are rigidly secured under and to the channel member 149 of each runway 20. The brackets are extended transversely of the runways, but the brackets on each runway are spaced from each other longitudinally of their respective runway.

Four pairs of brackets 179 and 180 are provided at the rearward ends of the runways 20, one pair of brackets being mounted on the inner side of each runway and another pair on the outer side of each runway. Further, the four brackets 179 are in substantial alignment transversely of the runways, as are the brackets 180. Also, it should be noted that each runway has an inner rear roller 181 and an outer roller 182 mounted individually in pairs of brackets 179 and 180. In addition, at its forward end, each runway has an inner roller, not shown, and an outer roller 184.

The front rollers 183 and 184 of each runway rest in rolling engagement on the subjacent front support rails 35. The rear rollers 181 and 182 are likewise supported on the rear support rail 65. The runways are thus mounted for movement transversely of each other along the support rails. Also, the runways are mounted for simultaneous elevational movement between level positions when the lift rams 75 are expanded, and inclined positions when the rams are contracted. In the inclined positions, the rear end portions 148 of the runways are at a lower elevation than the front end portions 147. The runways are thus raised and lowered incident to the raising and lowering of the rear rail 65. The rollers accommodate elevational movement of the rear rail 65 inasmuch as the concave surfaces of the rollers slide circumferentially on the convex surfaces 36 and 68 of their respective rails during said elevational movement of the rear rail.

It is also to be noted that strike plates 237 preferably are mounted on the floor 28 below the rear end portions 148. The rear end portions engage the strike plates in the inclined positions of the runways.

Of particular importance to the present invention, the subject rack includes runway guards 270 which are raised to the upwardly inclined position of FIG. 5 to prevent the automobile from rolling off the runways 20. For mounting the guards, guard hinges 271 are individually rigidly bolted to the wheel plates 151 in forwardly adjacent relation to the openings 163. Each guard is pivotally connected to a hinge 271 for elevational movement about a pivot 272 extended transversely of the runways. Each guard is thus movable between a lowered position (FIG. 6), wherein it is disposed in the opening 163, to the upwardly extended position of FIG. 4. A pair of spaced webs 273 are welded to and extend downwardly from each guard through the adjacent opening.

An identical over-center, toggle linkage 275 is provided in each runway 20. Each linkage includes a pair of transversely spaced pivot brackets 276 (FIG. 3) mounted on the central portion of the channel member 149 at a point below and, forwardly of the guard hinges 271. An L-shaped guard-retracting crank 277 includes an axle 278, constituting a first axis of the toggle linkage, rotatably journaled in the pivot brackets. It is noted that the axle is extended transversely of the runway and is parallel to the guard pivot pin 272. The retracting crank also has a handle 279 perpendicularly extended from the axle externally of the channel member.

Each toggle linkage 275 also includes a triangular link 284 having a lower front apex 285 rigidly secured to the axle 278 between the pivot brackets 276, a lower rear tubular apex 286, an upper apex 287, and a lateral shoulder 288 intermediate the upper and lower front apices. A guard pin 290, constituting a second toggle axis, is extended between and mounted on the webs 273 in downwardly and rearwardly spaced relation to the guard pivot pin 272. A toggle pin 291, constituting a third toggle axis, is journaled in the lower tubular apex 286 of the triangular link and is also parallel to the guard pivot pin 272 although located between the crank axle 278 and the guard pin 290. Toggle arms 292 pivotally interconnect corresponding opposite ends of the guard pin 290 and toggle pin 291, and a tubular spacer 293 (FIG. 3) circumscribes the guard pin between the toggle arms. The triangular link is pivotal with the crank axle between a guard locking position (FIGS. 4 and 5) wherein the guard 270 is pivoted into its guarding position and wherein said third axis, or toggle pin 291, is located below the common plane of the first axis, or crank axle 278, and the second axis, or guard pin 290, and an unlocking position (FIG. 6) with the guard released for movement into its retracted position and with the said third axis located above the said common plane of said first and second axes. The retracting crank is capable of moving the triangular link between its locking and unlocking positions but is primarily employed to move the link into unlocking position, as will be subsequently evident.

A mounting sleeve 298 (FIG. 3) is supported on the channel member 149 of each runway 20. A guard raising lever 299 includes an arm 301 and a horizontal shaft 300 journaled in the sleeve 298. The arm 301 of lever 299 projects radially downwardly from the shaft 300 while the horizontal shaft portion 300 is keyed to an upper arm 302 that projects radially upwardly into the channel member in an obtuse angular relation with the arm 301. A slide member, in the form of a capscrew 303, has one end threaded into a tapped hole in the arm 302 in upwardly spaced, parallel relation to the shaft 300. A cylindrical counterweight 305 is journaled on the arm 301 for rotation about an axis in downwardly spaced, parallel relation to the shaft 300.

Each toggle linkage 275 also includes an elongated actuating lever 310 which has a rear end 311 pivotally connected to the upper apex 287 of the corresponding triangular link 284 by an upper pin 312. The upper pin is parallel to the guard axis and constitutes a fourth axis of the toggle linkage. The lever has a lower edge 313 engageable with the shoulder 288 of the link 284. The lever extends forwardly within the channel member 149 and provides an elongated, longitudinally extended slot 315 terminating in a rear edge 316. The capscrew slide member 303 is slidably received in the slot of lever 310, and the head of the member 303 limits movement of the arm transversely away from the lever but permits said longitudinal slidable movement of the member within the slot.

When each link 284 is in its guard-locking posiiton (FIGS. 4 and 5), the lower edge 313 of the lever 310 abuts the corresponding shoulder 288 thereby to limit counterclockwise rotation of the link, as viewed in FIG. 5. The guard 270 is precluded from retracting when the link is in its guard locking position since downward pressure on the guard is ineffective to rotate the link in a counterclockwise direction; that is, such counterclockwise rotation is precluded by abutment of the shoulder 288 with the lever 310. In addition, downward pressure on the guard is ineffective to rotate the link in a clockwise direction because said third axis 291 of the linkage is below the plane of said first and second axes 278 and 290.

The described linkage 275 and the lever 299 provide a unique coaction between each runway 20 and its guard 270. When the runway is elevated from an inclined position, the linkage and the lever 299 automatically raise the guard. When the runway is lowered into inclined position, the guard remains in raised position; the linkage and the bell crank do not thereby automatically retract the guard.

More specifically, the coaction between each runway 20 and its guard 270 is best understood by reference to FIG. 6 where the runway is illustrated in an inclined position and the guard is illustrated in a retracted position. If the runway is elevated, the counterweight 305, acting through lever 299, causes the slide member 303 to bear against the rear edge 316, urging the lever 310 rearwardly or to the left in FIG. 6. This movement of lever 310 pivots the triangular link 284 in a counterclockwise direction about axle 278 and shoves rearwardly on the toggle links 292. Further, the toggle links pivot the guard 270 in a clockwise direction about pivot pin 272. When the runway is in its level position (FIG. 4), the toggle linkage 275 and the lever 299 have moved the guard into its fully raised position.

When the runway 20 is lowered from its level position (FIG. 4) into an inclined position, as illustrated in FIG. 5, the weight 305 moves into contact with the floor 28. The arm 302 is pivoted in a clockwise direction to move the slide member 303 forwardly in the slot 315. Thus, each triangular link is not pivoted in a clockwise direction when its runway is lowered; instead, said triangular link is merely conditioned for such clockwise movement by subsequent rotation of its axle 278 when the handle 279 is turned. The slot 315 in the lever 310 is longer than the stroke of the slide 303 so that the slide cannot slip out of the slot even if the counterweight 305 moves into engagement with the associated runway.

The handles 279 are turned either manually or by guard retracting rams 319 (FIGS. 3 and 7). These rams include cylinders 320 (FIG. 3) individually mounted rearwardly of the handles on the runways 20. The cylinders are provided with bleeding ports 321 (FIG. 7) of predetermined size, and piston rods 322 are reciprocally mounted in the cylinders in substantially normal relation to their respective handles 279. Hoses 323 are connected to the cylinders and have opposite ends connected to a control valve 324 which, in turn, is connected to the source 91 of fluid pressure through the main valve 93. Air is continuously delivered to the cylinders 320 at a predetermined slow rate and is bled from the ports in order to prevent accumulation of moisture in the cylinders 320 but without actuating the piston rods 322. If it is desired to actuate the guard retracting rams to rotate their respective handles, air is fed to the cylinders 320 at a rate more rapidly than air is exhausted from the ports so that the rods are extended. This is accomplished by energizing a solenoid 325 connected to the guard control valve. When the air pressure is relieved, the ports bleed the air from the cylinders and allow the rods to retract.

With reference to FIGS. 5 and 6, if the guard 270 is in a raised position, it is retracted by rotating the handle 277 in a clockwise direction. If the handle is rotated mechanically, the solenoid 325 need only be energized momentarily. Such momentary energization extends the piston rods 322 and effects the desired rotation of the handles. Furthermore, the handles remain in the positions illustrated in FIG. 6 and the guard remains in a retracted position. This is true even though the solenoid 325 is deenergized and the piston rods 322 are retracted. On the other hand, if sufficient force, either manual or mechanical, is applied to the handles to turn the same when the runways are in level position (FIG. 4), thereby retracting the guards, the guards are automatically returned to raised positions as soon as such pressure is relieved from the handles. This is believed understood since the levers 299 and associated weights 305 constantly urge the guards to raised positions when the runways are elevated in their level positions.

In addition to the foregoing, jack-supporting stands 326 are individually mounted on the inner ends of the front angle brackets 170 (FIG. 1), and lifting jacks 340 (FIG. 1) are individually mounted on the stands 326 for imparting lifting force to a vehicle, as 345 (FIG. 3), supported on the runways 20.

A switch box 375 (FIG. 2) is supported, in a manner not shown, at a position above the vehicle 345 and is suspended adjacent to the driver's window of the vehicle. The switch box contains switches 376 for controlling the solenoids 92 and 325 associated with the lift rams 75 and the guard rams 319, respectively.

In briefly summarizing its use, the rack of the subject invention is conveniently employed in association with wheel alignment apparatus (FIG. 1) including an upstanding screen 350 supported on the floor 28 forwardly of the rack and a pair of optical units 351 mounted on the floor in laterally outwardly adjacent relation to the front end portions 147 of the runways 20.

Before a vehicle 345 is driven onto the subject rack, it is assumed that the runways 20 are in their inclined positions and that the guards 270 are in their retracted positions (FIG. 6). The runways are then moved toward or away from each other to correspond to the distance between transversely aligned wheels, that is the tread width, of the vehicle 345. The vehicle is driven upwardly onto the runways until the front wheels rest on the turntables 161.

With the vehicle 345 on the runways 20, the lift rams 75 are expanded. Expansion of the rams raises the runways to level positions perpendicular to the screen 350 (FIGS. 1 and 3). Elevation of the runways causes the lower arm 301 of levers 299 to pivot downwardly, that is in a counterclockwise direction as viewed in FIG. 6, so that the guards 270 are raised into their guarding positions through the toggle linkages 275. Also, the safety legs 127 simultaneously swing downwardly by gravity, during elevation of the runways, so that their base abutment ends rest on, or are closely upwardly adjacent to, the longitudinal base portions 46 when the runways are in said level positions.

After the wheel alignment checks have been made, or other work on the vehicle 345 has been completed, the safety legs 127 are manually pivoted into engagement with the latches 135 whereupon the legs are held in retracted position. The lift rams are then retracted to lower the runways 20 into their inclined positions (FIG. 5). Although the arms 301 of the guard raising levers 299 are rotated in a clockwise direction, as viewed in FIG. 4, during such lowering of the runways, the guards 270 are not automatically retracted, as previously explained. In this manner, inadvertent rolling of the vehicle from the runways during lowering thereof is precluded. It is noted that free movement of the slide member 303 forwardly through their slots 315 assures unrestricted lowering of the runways. For example, any jamming of the toggle linkages 275 in pivoting from locked to unlocking positions does not interfere with lowering of the runways. Since positive connections are not provided between the levers 299 and their associated linkages, imposition of the weight of the vehicle on the arms 301 is avoided while the lift rams 75 retract. In order to retract the guards, it is necessary to move the toggle linkages into unlocking position, either manually or mechanically by actuation of the guard retracting rams 319.

Although a preferred embodiment of the present invention has been shown and described, it will be understood that various changes and modifications may be made in the details thereof without departing from the spirit and the scope of the appended claims.

Having described the invention, what is claimed as new and desired to be protected by Letters Patent is:

1. In a vehicle supporting rack including a runway that is mounted on a supporting surface for movement between raised and lowered positions, a guard pivotally mounted on the runway for movement between a down position generally flush with the runway and an up position projecting upward from the runway, and a toggle mechanism pivotally interconnecting the guard and the runway and being pivotable between a locking position when the guard is up and an unlocked position when the guard is down, said toggle mechanism in its locking position precluding movement of the guard from up to down position, the combination wherein said toggle mechanism includes link means for pivoting the toggle mechanism and guard between their respective positions, lever means mounted on the runway for elevational movement toward and away from the runway as the runway is raised and lowered, said link and lever means being coupled by control means which causes said lever and link means to move the toggle mechanism into its locked position and the guard into its up position when the runway is raised and which allows the toggle mechanism to remain in its locked position and said guard in its up position when the runway descends to and reaches its lowered position.

2. The supporting rack of claim 1 wherein said control means includes a slot in the link means, said slot extending lengthwise of the runway, and a slide member movable in said slot in response to movement of the lever means toward and away from the runway.

3. The vehicle supporting rack of claim 1 including means for moving the toggle mechanism from locked to unlocked position and thereby moving the guard from up to down position.

4. The rack of claim 3 wherein said moving means includes a control located along said runway in longitudinally spaced relation to the guard.

5. The supporting rack of claim 1 wherein said toggle mechanism includes a shoulder engageable by the link means for precluding pivotable movement of the toggle mechanism in one direction when the mechanism is in its locked position.

6. In a vehicle lift rack mounted on a support and including an elongated, elevationally adjustable wheel runway, a wheel abutting guard mounted on said runway for movement between raised and lowered positions, a linkage connected to said guard and mounted on said runway for movement between alternate positions raising and lower said guard and for releasably locking said guard in raised position, and guard control means borne by said runway for movement into and out of contact with said support during elevational adjustment of said runway, the improvement wherein the linkage has an elongated slot extended longitudinally of said runway and terminating in an end edge, and wherein said guard control means includes a slide slidably received in said slot for engagement with said end edge when the guard control means is moved out of contact with said support thereby to urge said linkage into its guard raising position, and for unrestricted movement in said slot away from said end edge when said means is brought into engagement with said support, said slide having a predetermined stroke as a result of movement of said guard control means into and out of contact with said support, said stroke being shorter than the length of said slot.

7. In a vehicle supporting apparatus adapted to be mounted on a foundation, a runway mounted for vertical movement between an elevated position spaced upwardly from said foundation and a retracted position downwardly spaced from said elevated position, a guard pivoted on said runway for movement about an axis extendend transversely of said runway between a guarding position angularly extended from said runway and a downwardly retracted position, toggle means pivotally connected to said runway and to said guard on first and second axes, each of said axes being below and parallel to said guard axis, said toggle means also including a third axis between and parallel to said first and second axes, said toggle means being pivotal on said first axis between a guard locking position wherein said third axis is below a plane containing said first and second axes and wherein said guard is raised into its guarding position, and an unlocking position wherein said third axis is above said plane and wherein said guard is lowered into its retracted position, and said toggle means including means limiting movement of said third axis below said plane in the locking position of said toggle means, and weighted foundation engaging means borne by said runway for movement between a position engageable with said toggle means for gravitationally urging said toggle means into its guard locking position when said runway is elevated to support said weighted means upwardly of said foundation, and a position releasing said toggle means for movement independently of said weighted means into its unlocking position when said runway is lowered to move said weighted means into engagement with said foundation, whereby with said guard in its guarding position movement of said runway into lowered position does not automatically move said guard into retracted position, but whereby with said guard in retracted position movement of said runway from said lowered position to said elevated position automatically moves said guard into its guarding position.

8. In a vehicle lifting apparatus including a runway having front and rear portions and being mounted for vertical movement between elevated and lowered positions relative to a foundation therebeneath, wherein a guard is pivoted on the runway for movement about an axis extended transversely on the runway between a guarding position rearwardly upwardly extended from the runway and a downwardly retracted position, and wherein an over-center linkage pivotally interconnects the runway and the guard for movement between first and second over-center, guard locking and unlocking positions with said guard respectively in its extended position and released for movement into its retracted position; the improvement wherein said linkage includes an elongated lever extended forwardly along said runway from said guard axis, said lever providing an elongated, longitudinally extended slot terminating in a rear edge; a crank including a shaft journaled transversely in said runway below said lever, an arm radially upwardly extended from said shaft adjacent to said lever, a slide outwardly extended from said arm and longitudinally slidably fitted in said slot, and a leg radially downwardly extended from said shaft in angular relation to said arm; and means connected to said leg for urging said slide against said rear edge thereby to move said linkage into said first over-center position when said runway is moved toward elevated position and for moving said slide away from said rear edge forwardly in said slot when said runway is moved toward lowered position thereby to release the linkage for movement into said second over-center position.

9. In the combination of an elongated runway having front and rear portions and being mounted for movement between elevated and lowered positions relative to a foundation therebeneath, and a guard pivoted on the runway for movement about an axis extended transversely on the runway between a guarding position rearwardly upwardly extended from the runway and a downwardly retracted position; a mechanism for releasably locking said guard in said guarding position comprising a toggle link pivoted to said runway for movement about a first axis in forwardly downwardly spaced relation to said guard axis; a toggle arm pivotally connected to said guard for relative rotation about a second axis in rearwardly upwardly spaced parallel relation to said first axis, said first and second axes being in a common plane, the arm being pivotally connected to said link on a third axis intermediate and parallel to said first and second axes, said link being pivotable about said first axis between a guard locking position wherein said guard is pivoted into its guarding position and said third axis is below said plane, and unlocking position with said guard released for movement into its retracted position and with said third axis above said plane, said link having a shoulder upwardly adjacent to said first axis; a bell crank pivoted on said runway on an axis in forwardly spaced parallel relation to said first axis, having a lower portion downwardly extended from said crank axis, and having an upper portion upwardly extended from said crank axis in an angular relation to said lower portion; and an elongated lever having a rear end pivotally connected to said link on a fourth axis in rearwardly, upwardly spaced parallel relation to said first axis and a front end portion having an elongated, longitudinally extended slot terminating in a rear edge, said crank including a slide borne by said upper portion and longitudinally slidably received in said slot, and a weight connected to said lower portion for gravitationally urging said slide against said rear edge of said slot whereby said link is rotated into its guard locking position and said lever is held in abutment with said shoulder to limit rotation of said link when said weight is spaced upwardly from said foundation, and whereby said slide is moved forwardly in said slot away from said rear edge when said weight engages said foundation upon movement of said runway toward lowered position so that said link is released for movement into unlocking position.

10. In the combination of an elongated runway having front and rear portions and being mounted for elevational movement between elevated and lowered positions relative to a foundation therebeneath, a guard pivoted on said runway for movement about an axis extended transversely of said runway between upwardly extended guarding and downwardly retracted positions, and an over-center linkage pivotally interconnecting said runway and said guard for movement between first and second over-center guard locking and unlocking positions with said guard respectively in its extended position and released for movement into its retracted position; the improvement wherein said linkage includes an elongated lever extended forwardly along said runway from said guard axis and providing an elongated, longitudinally extended slot terminating in a rear edge; a crank including a shaft journaled transversely in said runway below said lever, an arm radially upwardly extended from said shaft adjacent to said lever, a slide rigidly outwardly extended from said arm and longitudinally slidably fitted in said slot, and a leg radially downwardly extended from said shaft in angular relation to said arm; and means connected to said leg for urging said slide against said rear edge thereby to move said linkage into said first over-center position when said runway is moved toward elevated position, and for moving said slide away from said rear edge forwardly in said slot when said runway is moved toward lowered position thereby to release said linkage for movement into said second over-center position; a handle integral with said linkage for moving said linkage between its first and second over-center positions; and powered reciprocal means borne by said runway and engageable with said handle for pivoting said linkage from its first over-center position to its second over-center position.

11. In a vehicle supporting rack, a runway mounted for elevational movement between upper and lower positions, a guard pivoted on the runway for movement between upper and lower positions with respect to the runway, means for moving the guard from its lower position to its upper position in response to movement of the runway from its lower position to its upper position and for releasably precluding movement of said guard from its upper position to its lower position when the runway moves from its upper position toward and into its lower position, and means for releasing the guard to move it from its upper position to its lower position.

12. In a vehicle supporting rack, a wheel runway mounted for elevational movement between upper and lower positions, a guard mounted on said runway for movement between a stowed position wherein said guard does not prevent rolling of a wheel along the runway and a safety position wherein said guard obstructs rolling of a wheel on the runway, and means for automatically moving said guard from said stowed position to said safety position in response to movement of said runway from lower to upper position and for releasably maintaining said guard in said safety position when said runway descends to and reaches its lower position.

13. In a vehicle lift rack including an elevationally adjustable wheel runway, a wheel abutting guard mounted on said runway for movement between raised and lowered positions, linkage means mounted on said runway for moving said guard between its raised and lowered positions and for releasably locking said guard in its raised position, actuating means engageable with said linkage means for operating said linkage means to effect the movement of the guard to its lowered position, and control means located at a position relatively remote from said guard for causing said actuating means to operate said linkage means.

14. The lift rack of claim 13 wherein said runway is mounted for movement between an elevated position and a lowered position, wherein said linkage means releasably maintains said guard in its raised position whenever said runway is in its elevated position, wherein said linkage means allows said guard to be moved into and to remain in its lowered position whenever said runway is in its lowered position, and wherein said control means, actuating means, and linkage means are operable to move said guard into its lowered position after said runway is moved from its elevated position to its lowered position.

References Cited by the Examiner
UNITED STATES PATENTS

| | | | |
|---|---|---|---|
| 1,552,326 | 9/1925 | Lunati. | |
| 1,938,446 | 12/1933 | Bacher | 187—8.52 |
| 1,946,320 | 2/1934 | Hollister | 187—8.52 |
| 1,955,586 | 4/1934 | Hott et al. | 187—8.52 |

SAMUEL F. COLEMAN, *Primary Examiner.*